April 4, 1939.  A. R. LINTERN  2,153,147

VEHICLE VENTILATING AND SIGNAL UNIT

Filed Aug. 12, 1936   2 Sheets-Sheet 1

INVENTOR
Alfred R. Lintern.
BY
Harness, Dickey, Pierce & Hann.
ATTORNEYS.

April 4, 1939.  A. R. LINTERN  2,153,147
VEHICLE VENTILATING AND SIGNAL UNIT
Filed Aug. 12, 1936   2 Sheets-Sheet 2
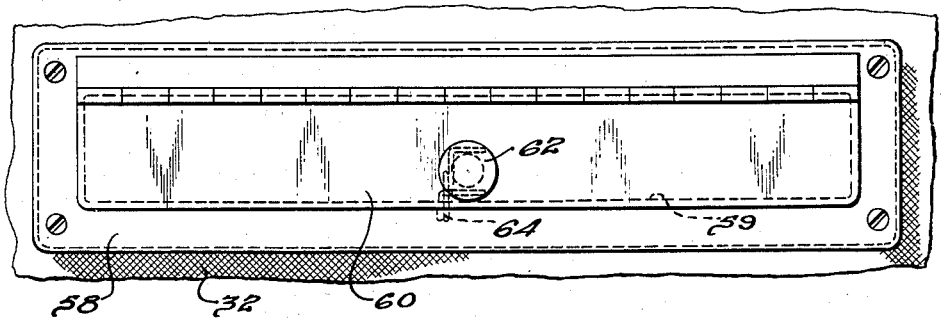
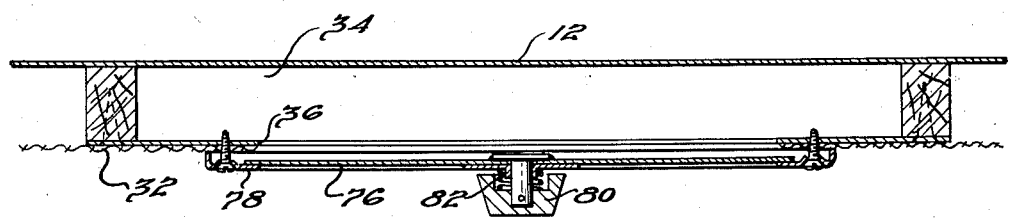
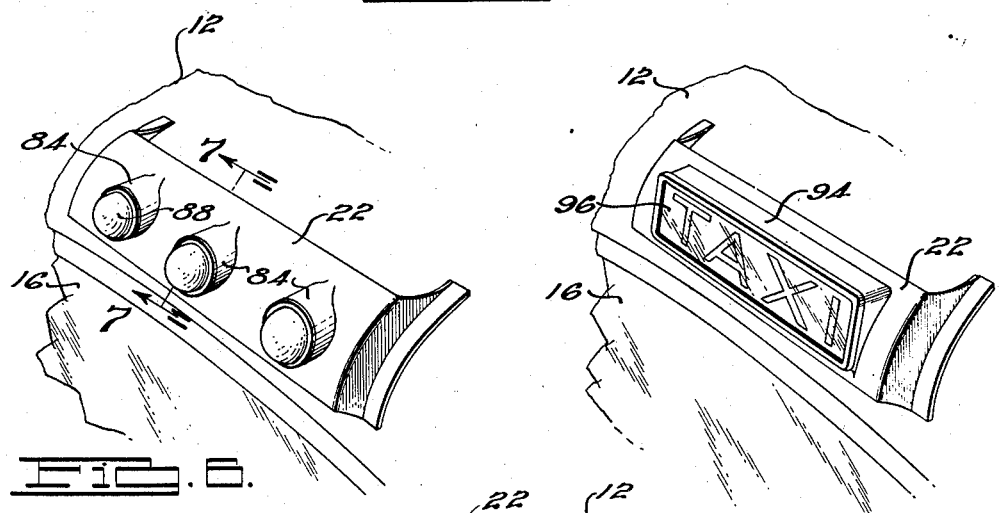
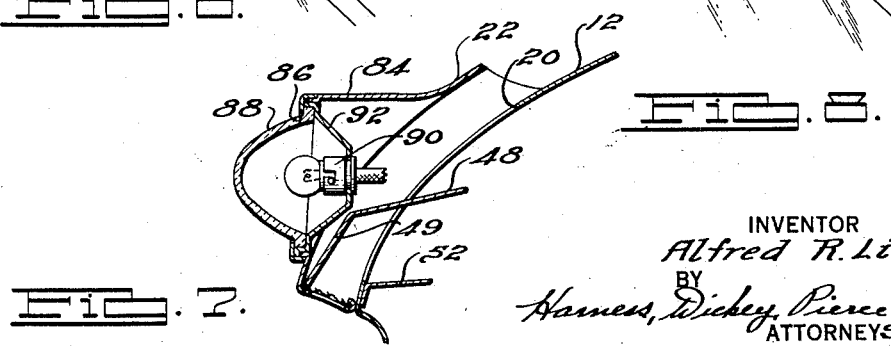
INVENTOR
Alfred R. Lintern.
BY
Harness, Dickey, Pierce & Hann
ATTORNEYS.

Patented Apr. 4, 1939

2,153,147

UNITED STATES PATENT OFFICE 2,153,147

VEHICLE VENTILATING AND SIGNAL UNIT

Alfred R. Lintern, Detroit, Mich., assignor to Evans Products Company, a corporation of Delaware Application August 12, 1936, Serial No. 95,508

9 Claims. (Cl. 98—2)

This invention relates to improvements in ventilating vehicles and in particular relates to ventilating vehicles in which air is injected into and ejected from the interior of vehicles.

Objects of the invention are to provide in vehicles a ventilating unit by which fresh air is injected into vehicles and vitiated air is ejected from vehicles; to provide a structure in which air may be simultaneously injected into and ejected from the interior of a vehicle by providing an opening or openings in the conventional roof structure of a vehicle and securing a rigid member to the roof structure over the outside of the opening and a rigid member to the interior of the roof structure over the opening, the members cooperating to form the ventilating structure; to provide an injector and ejector ventilating unit with marker signals included therewith, the marker signal cooperating in directing the air to assist in the ventilation and the ventilator cooperating with the signal to keep it in proper operating condition; and to provide a rugged, unitary ventilating and signal structure inexpensive to manufacture.

Other objects of the invention will become apparent from the following specification, the drawings relating thereto, and from the claims hereinafter set forth.

In the drawings, in which like numerals are used to designate like parts in the several views throughout:

Fig. 4 is an enlarged fragmentary view, taken in the direction of the arrows 4—4 of Fig. 2;

Fig. 5 is an enlarged vertical cross-sectional view, taken substantially along the line 5—5 of Fig. 1;

Fig. 6 is a perspective view showing a modified form of the present invention;

Fig. 7 is an enlarged vertical cross-sectional view, taken substantially along the line 7—7 of Fig. 6; and Fig. 8 is a perspective view showing another modification of the present invention.

Figure 1:
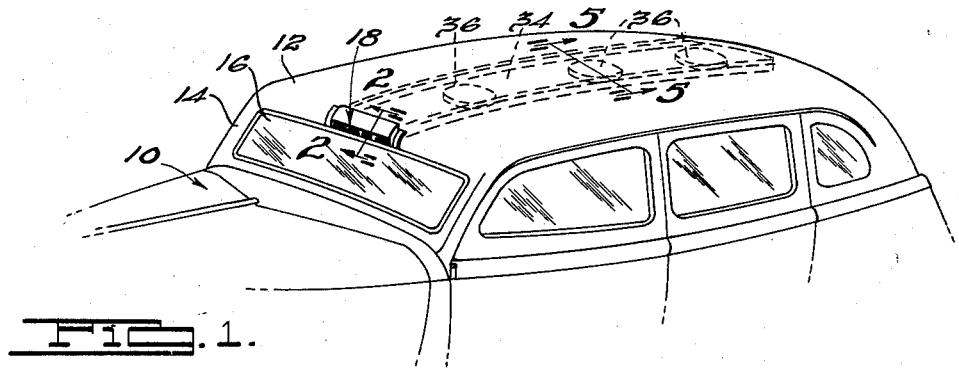
Figure 1 is a fragmentary perspective view of a vehicle embodying features of the present invention.

The present invention relates to improvements over the structure shown in United States Letters Patent No. 1,969,934, granted August 14, 1934, to William Lintern and Alfred R. Lintern and the structure disclosed in the co-pending application of William Lintern and John B. Lintern, Serial No. 1,916, filed January 15, 1935. In the patent referred to, a structure is disclosed in which air is injected into the body of a vehicle and ejected from the body for the purpose of maintaining the interior of the body in a properly ventilated condition. In the co-pending application referred to, a structure is provided in which a signal unit is combined with a ventilating unit so that a portion of the signal unit assists in ejecting air from the interior of the car and the ejected air serves to maintain the signal unit in proper operating condition.

The present invention provides a structure which may conveniently be applied to a conventional vehicle roof structure without the necessity of constructing a special roof. According to the present invention, a single opening or a plurality of openings are provided in the conventional roof structure adjacent the top of the front wall of the vehicle above the windshield; and a deflector is so arranged over the opening or openings that the single deflector divides or separates the air passing over the body so as to direct a portion of the air into the body and cause a portion to pass above the top of the vehicle, creating a low pressure area at that region to withdraw or eject air from within the vehicle. Either a single opening or a plurality of openings into the interior of the vehicle, adjacent the top of the front wall of the vehicle, above the windshield, may be provided; and when more than one opening is used, a pair of openings, one above the other, are provided, the openings being separated by a transverse strip. In such a structure, in order to separate the ingoing and outcoming columns of air within the vehicle, a transversely extending dividing plate is provided and is mounted on the inside, terminating by abutting against the inner side of the transverse strip, and another transverse member is provided between the deflector and the outer side of the transverse strip which extends from the deflector toward and abuts against the outside face of the transverse strip. The ingoing and outgoing columns of air are maintained separate by such a structure.

In the preferred embodiment, as illustrated in the drawings, a single opening is provided, and a unitary means, including a transversely extending dividing plate, is provided and mounted on the inside of the roof structure and cooperates with the deflector through the roof opening, so as to keep separated the column of air entering the vehicle and the column of air leaving the vehicle. This separating plate is so positioned that any foreign material, or water, from the outside which enters the opening to the vehicle, is prevented from gaining access to the interior of the body and is carried or drained to a point outside of the body. Baffles are also provided in the incoming channel so as to assist in the prevention of foreign material from entering the body and also to assist in breaking up the incoming stream so that a forced draft is not noticeable to occupants of the vehicle. Adjustable shutters are also provided within the channels or ducts to control and regulate the ventilation of the vehicle body. The present invention provides a structure by which air may be simultaneously injected into and ejected from the interior of a vehicle through an opening in the conventional roof structure of the vehicle, and provides a simplified structure which may be readily applied to the conventional vehicle body structure.

In vehicles, and particularly in trucks, buses and taxis, it is often desirable and necessary, as required by law, that they carry certain types of signal units. In such vehicles, it is also particularly necessary that the interiors thereof be maintained in the proper ventilated condition and the present invention provides a structure in which both of these features of ventilation and signaling are combined. In the present invention, the deflector, which separates the incoming air to direct a portion into the vehicle and eject the air from the vehicle, is so constructed that it serves as a signal unit at the same time performing its ventilating function. The signal unit includes transparent portions and electrically illuminated lamps; and the transverse dividing plate is so formed and arranged that these elements may be located in the channel or duct through which the ejected air passes. It is particularly important in cold weather that the facing transparent portion and illuminating mechanism of the signal means be kept free of snow and ice, and by locating these elements in the duct carrying the ejected air, the ejected air, being warmer than the outside air, effectively prevents the formation of ice on the signal means and will maintain the signal means in a proper operating condition. Also, the air sweeping up over the face of the deflector will prevent any snow or water from adhering to the face of the signal and will therefore maintain the signal always visible to outside observers.

For a better understanding of the invention, reference may be had to the drawings in which the preferred embodiment of the invention is illustrated, and in Fig. 1 a vehicle 10 is illustrated having a roof 12 joining a forwardly facing wall 14 in which a conventional windshield 16 is located. An injector and ejector ventilating unit, generally indicated at 18, is mounted immediately above the windshield, preferably at the transverse center of the car, and communicates with the interior of the car in a manner to be described in further detail.

Figure 2:
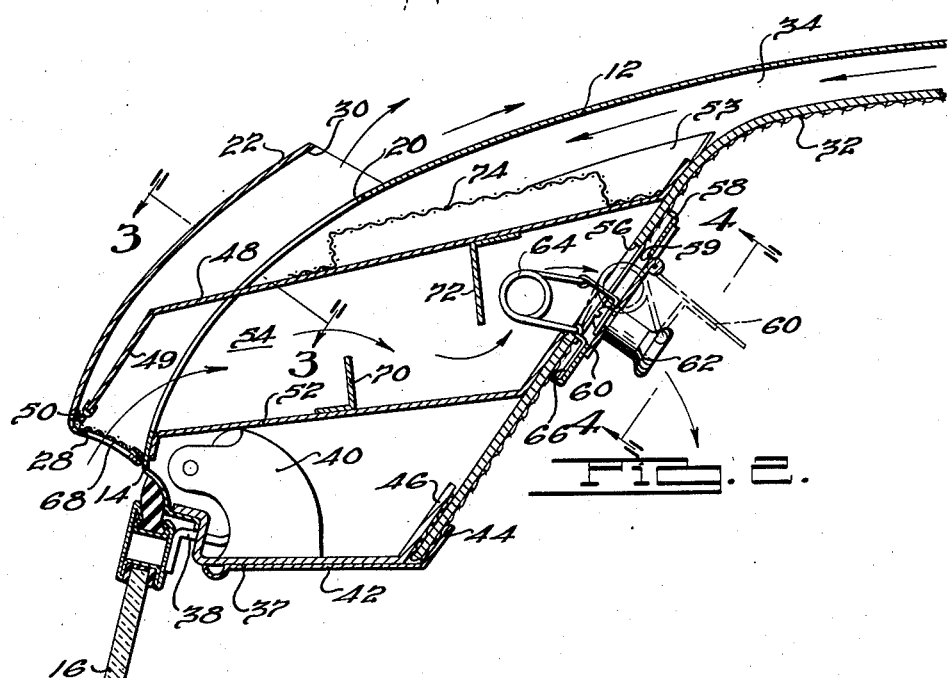
Fig. 2 is an enlarged fragmentary vertical cross-sectional view, taken substantially along the line 2—2 of Fig. 1.

Referring to the remaining figures and particularly to Fig. 2, an opening 20 is provided in the upper portion of the forwardly facing wall adjacent its juncture with the roof 12. A deflector 22 is positioned over the opening in spaced relation thereto and has inwardly directed side walls 24 at its ends to close the ends, the walls 24 terminating in outwardly directed flanges 26 which are suitably secured to the outside of the forward face 14. Lower openings 28 and an upper opening 30 are provided between the deflector 22 and the car body and communicate with the opening 20. The air passing over the body is divided by the deflectors so that a portion enters the body through the opening 28, and a low pressure area is created adjacent the opening 30 to withdraw air from the interior of the car in a manner described in the above referred to patent.

Head lining 32 is provided in spaced relation to the roof 12 and a duct 34 is provided along the longitudinal center of the vehicle between the head lining and the roof, which duct communicates with the interior of the car through suitable openings 36 and is in communication with the outside of the car through the opening 20. A casing 37 is suitably secured to the interior of the vehicle body over the opening 20 by means of bracket members 38 secured to the front wall of the vehicle at its sides and which are secured to the members 40 forming a part of the casing 37. The casing 37 is also secured to the head lining 32 by means of a strip 42 having an upstanding portion 44 which cooperates with an upstanding portion 46 of the casing to hold therebetween a portion of the head lining 32.

Within the casing is mounted a unitary structure which includes a transversely extending member 48, which is secured at its inner end to the inner roof structure 32 and which slopes downwardly and outwardly through the opening 20 and is held in place relative to the deflector 22 adjacent the opening 28 by means of a Y-shaped sealing strip 50 preferably made of a resilient material, such as rubber. The transversely extending member 48 separates the outgoing air in the duct 34 from the air entering through the opening 28, and another transversely extending member 52 is provided below the member 48 to form the lower confining wall of a duct 54 within which air entering through the opening 28 is confined. The member 52 is provided with upstanding side walls 53 which form the end confining walls of the duct 54 and between which the member 48 extends.

A transversely extending opening 56 is provided in the head lining 32 at the inner end of the duct 54 communicating with the interior of the vehicle. A frame mounting 58 is provided over the inner face of the opening 56 on the inner roof structure 32 and has an opening 59 in alignment with the opening 56, over which a shutter 60 is hingedly mounted along its upper edge. A gripping means 62 is provided on the inner face of the shutter 60 substantially at its transverse center and has operatively connected to it at the back of the shutter one end of an offset snap spring 64, the other end of the snap spring being fixedly secured to the lower edge of the mounting frame 58, as at 66. The shutter 60 is shown in Fig. 2 in its closed position over the opening in the mounting frame 58 and is resiliently held in this closed position by means of the snap spring 64. The shutter may be pulled out to the position shown in the dotted lines in Fig. 2 to establish communication between the duct and the interior of the vehicle and the shutter will be resiliently held in this position by means of the snap spring 64.

A screen 68 is preferably provided over the openings 28 to filter the incoming air of any foreign material. An upstanding baffle 70 is mounted on the transversely extending member 52 within the duct 54, and a downwardly extending baffle 72 is mounted on the under face of the transversely extending member 48 within the channel 54. These baffles will break up the incoming air within the channel 54 and, by causing a swirling of the air, will prevent the passage of any foreign material, such as water, to within the vehicle body, as the swirling action and direct impingement against the baffles causes separation of foreign material from the air. Also in breaking up the incoming stream of air, undesirable forced currents of air within the vehicle body are prevented.

Figure 3:
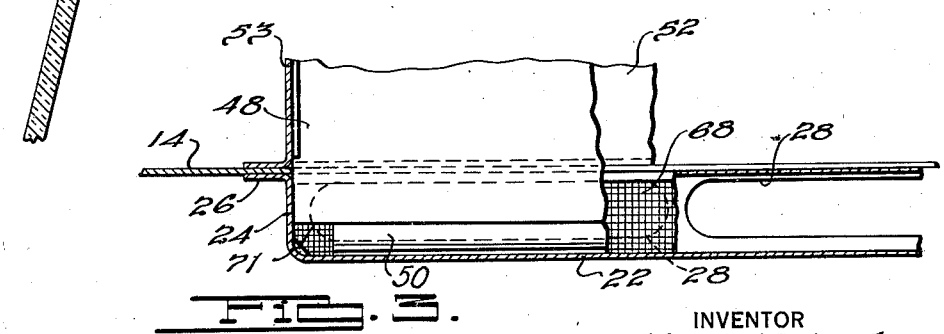
Fig. 3 is a fragmentary cross-sectional view, with parts broken away, taken substantially along the line 3—3 of Fig. 2.

Both of the transversely extending members 48 and 52 are sloped downwardly and outwardly so that any water or moisture collected thereon will be drained outside of the body. Cutaway portions may be provided in the lower corners of the member 48 to provide passages 71, as indicated in Fig. 3, to drain any water collected on the top of the transversely extending member 48. A baffle or screen 74 is preferably mounted on the upper face of the transversely extending member 48 to prevent the entrance of any foreign material from the outside, through the openings 30 and 20, to the duct 34, and from there into the interior of the vehicle. An inrush of air through the openings 30 and 20 will be broken up by the baffle 74 causing swirling and effecting separation of any foreign material from the air.

Any suitable means may be provided for controlling communication between the channel 34 and the interior of the car, and the means illustrated in Fig. 5 by way of example comprises a rotatably adjustable grill disc 76 which is mounted over the opening 36 by means of a mounting frame 78 suitably secured to the inner roof structure 32 over the openings 36 and provided with openings which cooperate with openings in the grill disc 76 when the disc is in one position to establish communication between the duct 34 and the interior of the vehicle, but which are closed by the disc 76 when it is in another position, so that no communication exists between the interior of the car and the duct 34. A hand knob 80 is fixedly secured to the disc 76 and is provided with a spring 82 which resiliently holds the disc 76 against the mounting frame 78, and by rotating the disc 76, the desired degree of communication between the duct 34 and the interior of the car may be adjustably controlled. By the provision of the plurality of openings 36, longitudinally of the car, the air current within the car may be effectively controlled to get the desired ventilation.

Referring to the modification shown in Figs. 6 and 7, a signaling means is combined with the ventilator by providing on the deflector plate 22 a suitable number of outwardly extending portions 84 having openings 86 formed therein. Suitable transparent means, such as glass lenses 88, are mounted within the openings 86, and electric illuminating means 90, such as a lamp bulb, are mounted behind the lenses 88 by means of and within the reflectors 92.

By reference to Fig. 7 it can be seen that the member 48 extends toward the deflector 22 and is bent downwardly at 49 so that the lenses and reflecting or illuminating elements may be mounted above the transversely extending member 48 and are located in the channel or duct through which the air leaving the vehicle passes. By constructing the member 48 as described, it can be seen by comparing Figs. 2 and 7 that the same inside unitary structure may be used without change with either the type of deflector shown in Fig. 2 or the signal deflector shown in Fig. 7.

The effect of the exhaust air, which in cold weather is relatively warmer than the outside air, is to prevent the formation of ice on the lenses 88 and to maintain the electrical connections for the illuminating means in a dry and operating condition. Also the air sweeping up over the front face of the deflector 22 will sweep over the outer faces of the lenses 88 and will prevent the adherence of foreign material, such as snow, to these lenses.

In the modification shown in Fig. 8, the deflector 22 is provided with an outwardly directed portion 94, transversely of the deflector, having an opening extending transversely thereof, in which a facing plate, such as a glass plate having suitable display indicia thereon, is mounted. Illuminating means similar to those shown in Fig. 7 are also provided behind the display face 96 in the same relation relative to the exhausting duct as shown in Fig. 7.

Formal changes may be made in the specific embodiments of the invention described without departing from the spirit and substance of the broad invention, the scope of which is commensurate with the appended claims.

I claim as my invention:

1. A vehicle body and ventilator comprising a roof structure and a forwardly facing wall adjacent thereto, an opening in the upper portion of said forwardly facing wall communicating with the interior of the body, a deflector means positioned over said opening forwardly spaced from said wall and arranged to separate the air stream passing over the body so as to direct a portion thereof into the opening and a portion thereof away from the opening, and means engaging said deflector means and extending through said opening to provide a plurality of separated ducts communicating with the interior of said body.

2. A vehicle body and ventilator comprising a conventional roof structure and a forwardly facing wall adjacent thereto, an opening in the upper portion of said forwardly facing wall communicating with the interior of the body, a fixed deflector means positioned over said opening forwardly spaced from said wall and arranged to separate the air stream passing over the body so as to direct a portion thereof into the opening and a portion thereof away from the opening, and a unitary structure mounted within said roof structure including a means engaging said deflector means and extending through said opening to provide a plurality of separated ducts communicating with the interior of said body.

3. A vehicle body and ventilator comprising a roof structure and a forwardly facing wall adjacent thereto, an opening in the upper portion of said forwardly facing wall communicating with the interior of the body, a deflector means positioned over said opening in spaced relation thereto arranged to separate the air stream passing over the body so as to direct a portion thereof into the opening at the lower region thereof and a portion thereof away from the opening at the upper region thereof, and means associated with said deflector means and said opening to provide a plurality of separated ducts communicating with the interior of said body, one of said ducts being in communication with the upper region of said opening and the other of said ducts being in communication with the lower region of said opening.

4. A vehicle body and ventilator comprising a roof structure and a forwardly facing wall adjacent thereto, an opening in the upper portion of said forwardly facing wall communicating with the interior of the body, a deflector means positioned over said opening forwardly spaced from said wall and arranged to separate the air stream passing over the body so as to direct a portion thereof into the opening and a portion thereof away from the opening, and a transversely extending member sloped downwardly through said opening toward said deflector means to provide a plurality of separated ducts communicating with the interior of said body.

5. A vehicle body and ventilator comprising a roof structure and a forwardly facing wall adjacent thereto, an opening in the upper portion of said forwardly facing wall communicating with the interior of the body, a deflector means positioned over said opening in spaced relation thereto arranged to separate the air stream passing over the body so as to direct a portion thereof into the opening at the lower region thereof and a portion thereof away from the opening at the upper region thereof, and a transversely extending member sloped downwardly through said opening toward said deflector means to provide a plurality of separated ducts communicating with the interior of said body, one of said ducts being in communication with the upper region of said opening and the other of said ducts being in communication with the lower region of said opening.

6. A vehicle body and ventilator comprising a roof structure and a forwardly facing wall adjacent thereto, an opening in the upper portion of said forwardly facing wall communicating with the interior of the body, a deflector means positioned over said opening in spaced relation thereto arranged to separate the air stream passing over the body so as to direct a portion thereof into the opening at the lower region thereof and a portion thereof away from the opening at the upper region thereof, and a transversely extending member sloped downwardly through said opening toward said deflector means to provide a lower duct in communication with the lower region of said opening and an upper duct in communication with the upper region of said opening, said deflector means including a signal unit located in the upper of said ducts.

7. A vehicle body and ventilator comprising a roof structure and a forwardly facing wall adjacent thereto, an opening in the upper portion of said forwardly facing wall communicating with the interior of the body, a deflector means having an upstanding face positioned over said opening in spaced relation thereto arranged to separate the air stream passing over the body so as to direct a portion thereof into the opening at the lower region thereof and a portion thereof away from the opening at the upper region thereof, and a transversely extending member sloped downwardly through said opening toward the lower portion of said deflector means to provide a plurality of separated ducts communicating with the interior of said body to provide an upper and a lower duct communicating with the interior of said body, said face of said deflector comprising a signal means having an illuminating means mounted therebehind in said upper duct.

8. A vehicle body and ventilator comprising a roof structure and a forwardly facing wall adjacent thereto, means forming an exhaust duct communicating with the interior of the body an opening in the upper portion of said forwardly facing wall communicating with the interior of the body through said duct, a deflector means positioned over the opening in spaced relation thereto arranged to direct a portion of the air passing over said body away from the opening adjacent its upper end to withdraw air from the interior of said body through said duct and arranged to direct a portion of the air passing thereover into the body through said opening, means associated with said deflector means forming a conduit confining the passage of air through said opening into the body and a baffle screen located within said duct adjacent said opening.

9. A vehicle body and ventilator comprising a roof structure and a forwardly facing wall adjacent thereto, an opening in the upper portion of said forwardly facing wall communicating with the interior of the body, a deflector means positioned over said opening in spaced relation thereto arranged to separate the air stream passing over the body so as to direct a portion thereof into the opening at the lower region thereof and a portion thereof away from the opening at the upper region thereof, and a transversely extending member passing through said opening and engaging said deflector means to provide a plurality of separated ducts communicating with the interior of the body, one of said ducts being in communication with the upper region of said opening and the other of said ducts being in communication with the lower region of said opening.

ALFRED R. LINTERN.